(12) United States Patent
Boccoleri et al.

(10) Patent No.: US 9,335,447 B2
(45) Date of Patent: May 10, 2016

(54) FRESNEL LENS WITH LIGHT-SCATTERING PREVENTIVE FEATURE

(71) Applicants: Gianni R. Boccoleri, Lantana, TX (US); David P. Chase, Southlake, TX (US); Robert L. York, Lantana, TX (US); Paul Huy Nguyen, Flower Mound, TX (US)

(72) Inventors: Gianni R. Boccoleri, Lantana, TX (US); David P. Chase, Southlake, TX (US); Robert L. York, Lantana, TX (US); Paul Huy Nguyen, Flower Mound, TX (US)

(73) Assignee: STRYKER CORPORATION, Kalamazoo, MI (US)

( * ) Notice: Subject to any disclaimer, the term of this patent is extended or adjusted under 35 U.S.C. 154(b) by 48 days.

(21) Appl. No.: 14/529,524

(22) Filed: Oct. 31, 2014

(65) Prior Publication Data

US 2015/0138654 A1    May 21, 2015

Related U.S. Application Data

(60) Provisional application No. 61/907,172, filed on Nov. 21, 2013.

(51) Int. Cl.
    G02B 9/00    (2006.01)
    G02B 9/08    (2006.01)
    G02B 3/08    (2006.01)
    G02B 5/00    (2006.01)

(52) U.S. Cl.
    CPC . *G02B 3/08* (2013.01); *G02B 5/003* (2013.01)

(58) Field of Classification Search
    CPC .......... G02B 5/005; G02B 27/58; G02B 3/08; G02B 3/00
    USPC .......................................... 359/738, 742, 743
    See application file for complete search history.

(56) References Cited

U.S. PATENT DOCUMENTS

| | | |
|---|---|---|
| 5,128,848 A | 7/1992 | Enders et al. |
| 5,820,253 A | 10/1998 | Scholz |
| 6,250,774 B1 | 6/2001 | Begemann et al. |
| 6,402,351 B1 | 6/2002 | Borders et al. |
| 6,644,837 B2 | 11/2003 | Borders et al. |
| 6,692,141 B2 | 2/2004 | Jesurun et al. |
| 6,863,417 B2 | 3/2005 | Hill |
| 6,863,422 B2 | 3/2005 | Jesurun et al. |
| 7,701,151 B2 | 4/2010 | Petrucci et al. |
| 7,812,551 B2 | 10/2010 | Hite et al. |
| 7,857,619 B2 | 12/2010 | Liu |
| 7,990,078 B2 | 8/2011 | Petrucci et al. |
| 8,172,751 B2 | 5/2012 | Kusner et al. |
| 2006/0039160 A1 | 2/2006 | Cassarly et al. |
| 2010/0053982 A1 | 3/2010 | Klaus et al. |
| 2012/0253138 A1 | 10/2012 | Kusner et al. |
| 2013/0258661 A1 | 10/2013 | Jousse et al. |
| 2014/0268751 A1 | 9/2014 | Boccoleri et al. |

*Primary Examiner* — James Greece
(74) *Attorney, Agent, or Firm* — Flynn, Thiel, Boutell & Tanis, P.C.

(57) ABSTRACT

A Fresnel lens including a plurality of sawtooth-shaped projections, with each projection including a first surface at a first angle and a second surface at a second angle. Each first surface has top and bottom edges and each second surface has top and bottom edges. Each projection has a top intersection where the top edge of the first surface intersects the top edge of the second surface. Adjacent projections have a bottom intersection where the bottom edge of the second surface of a first one of the adjacent projections intersects the bottom edge of the first surface of a second one of the adjacent projections. The lens portion is opaque at the top intersection of the projections, at the bottom intersection of adjacent projections, and on the first surface between the top intersection and the bottom intersection.

16 Claims, 5 Drawing Sheets

FRESNEL LENS WITH LIGHT-SCATTERING PREVENTIVE FEATURE

CROSS REFERENCE TO RELATED APPLICATION

This application claims the benefit of U.S. Provisional Application Ser. No. 61/907,172, filed Nov. 21, 2013, which is incorporated herein by reference in its entirety.

FIELD OF THE INVENTION

The present invention relates to a lens, and in particular to a Fresnel lens.

BACKGROUND OF THE INVENTION

FIGS. 1 and 2 illustrate a prior art Fresnel lens 10. The prior art Fresnel lens 10 includes a transparent lens portion 12 and a redirecting lens portion 14. The transparent lens portion 12 is a substantially transparent disc or plate having a front side 16 and a rear side 18. The redirecting lens portion 14 extends from the rear side 18 of the transparent lens portion 12. The redirecting lens portion 14 includes a plurality of sawtooth-shaped protrusions 20 extending from the transparent lens portion 12. Each protrusion 20 includes a non-refracting surface 22 and a refracting surface 24. As is well known to those skilled in the art, the non-refracting surfaces 22 of the protrusions 20 are configured to be substantially parallel to rays of light which enter the lens 10 such that the light will not refract off of the non-refracting surfaces 22. If the rays of light entering the front side 16 of the transparent lens portion 12 of the prior art Fresnel lens 10 are parallel to each other, the non-refracting surfaces 22 can be parallel to each other and perpendicular to the front side 16 of the transparent lens portion 12. The light will then refract off of the refracting surfaces 24 to alter the direction of the light. Alternatively, light can enter the lens 10 through the redirecting lens portion 14 and be redirected by the refracting surfaces 24. The non-refracting surfaces 22 can be parallel to the light entering the lens 10 so as to minimize refraction of the light or the refracting surfaces 24 can be configured to redirect light entering the lens 10 away from the non-refracting surfaces 22. The refracting surfaces 24 can be parallel to each other to redirect the angle of all of the light rays at the same angle or can be at slightly different angles to focus the light travelling through the prior art Fresnel lens 10 at a single area.

FIGS. 3 and 4 illustrate a second embodiment of a prior art Fresnel lens 10a, wherein the protrusions 20a form a plurality of concentric circles with a normal convex lens 26 in a center of the lens 10a. Prior art Fresnel lenses can take other forms and have other configurations as is well known to those skilled in the art, wherein such lenses each have a plurality of projections, with each projection having a non-refracting surface and a refracting surface.

SUMMARY OF THE INVENTION

The present invention, according to one aspect, is directed to a Fresnel lens that reduces scattering of light being emitted from the Fresnel lens. The Fresnel lens includes a substrate having a first face and a second face. The first face of the substrate includes a lens portion comprising a plurality of generally sawtooth-shaped projections, and each projection is defined by a pair of adjacent and intersecting surfaces. More specifically, each projection includes a non-refracting surface and an angled refracting surface. The non-refracting surfaces of the respective projections can be substantially parallel to one another. Each non-refracting surface has a top edge and a bottom edge and each angled refracting surface has a top edge and a bottom edge. Each projection has a top intersection where the top edge of the non-refracting surface intersects the top edge of the angled refracting surface. Adjacent projections have a bottom intersection where the bottom edge of the angled refracting surface of one of the projections intersects the bottom edge of the non-refracting surface of an adjacent one of the projections. The lens portion is opaque at at least one of (1) the top intersection of at least one of the projections and (2) the bottom intersection of at least two adjacent projections.

BRIEF DESCRIPTION OF THE DRAWINGS

One or more embodiments of the present invention are illustrated by way of example and should not be construed as being limited to the specific embodiments depicted in the accompanying drawings, in which like reference numerals indicate similar elements.

Figure 1:
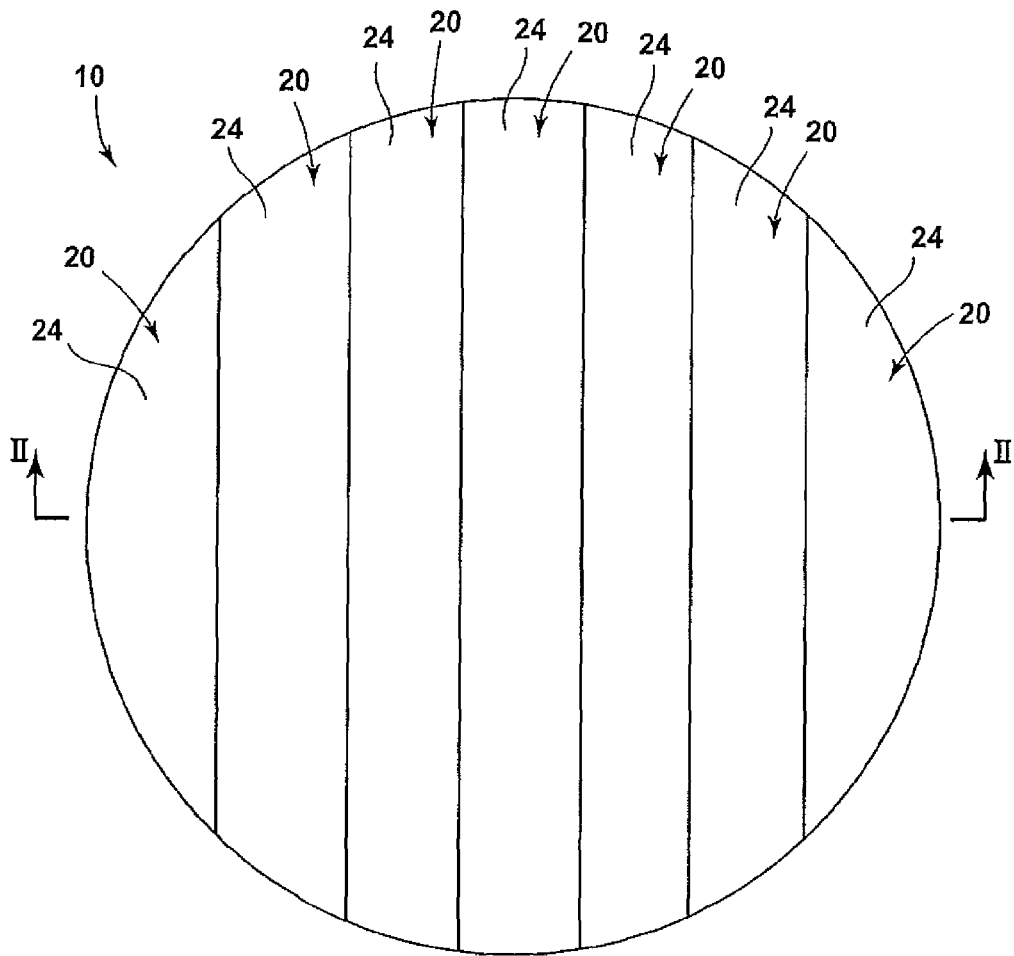
FIG. 1 is a top view of a first prior art Fresnel lens.
Figure 2:
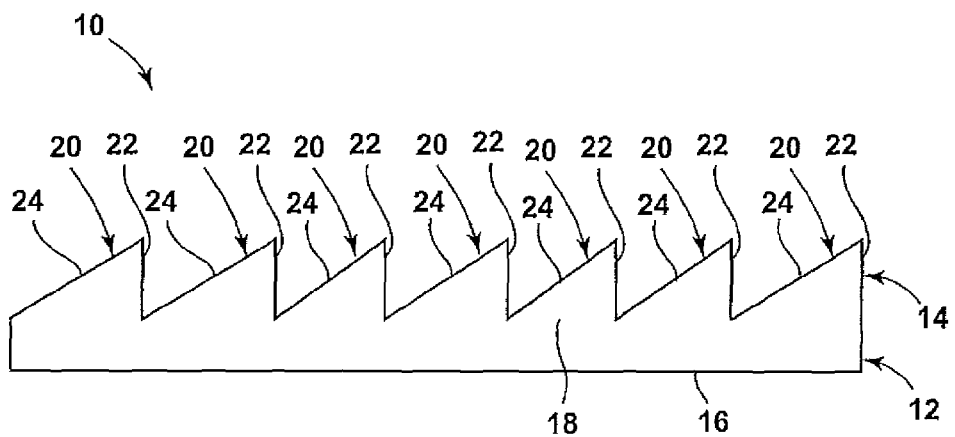
FIG. 2 is a cross-sectional view of the first prior art Fresnel lens taken along the line II-II of FIG. 1.
Figure 3:
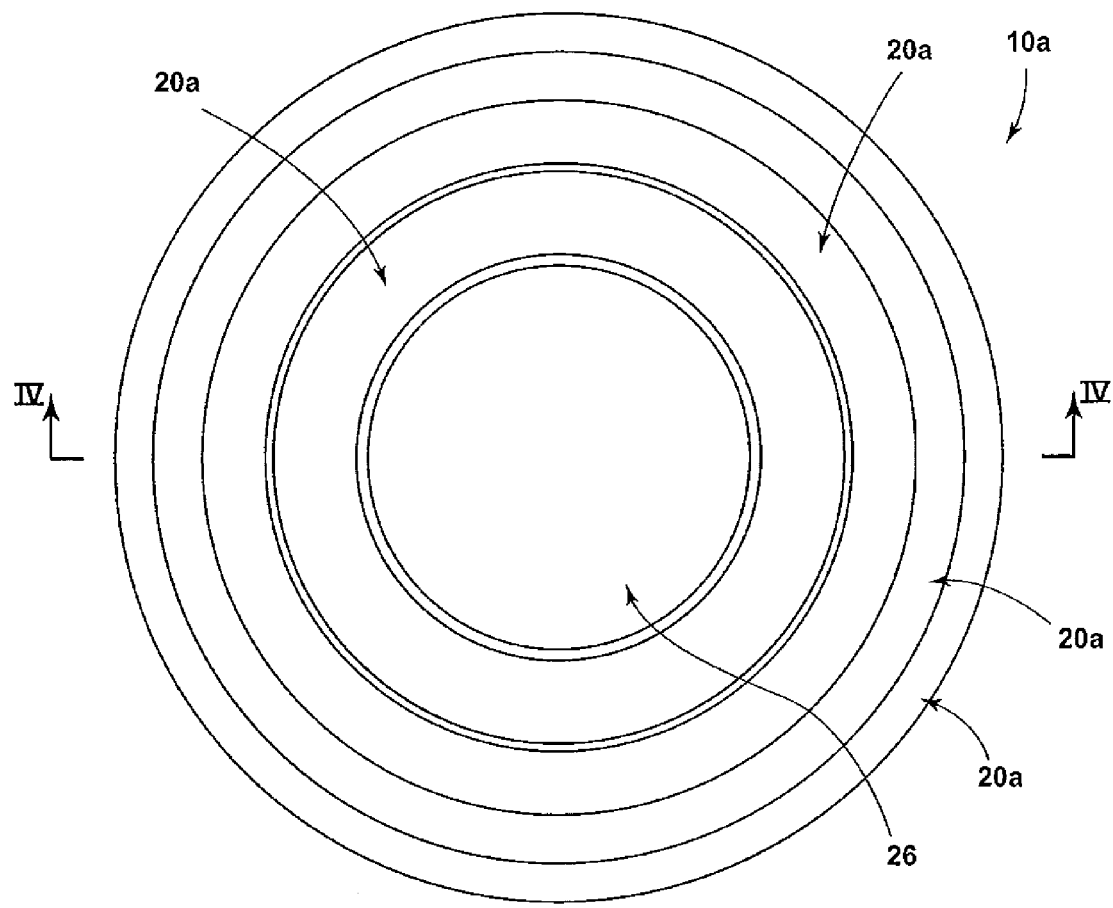
FIG. 3 is a top view of a second prior art Fresnel lens.
Figure 4:
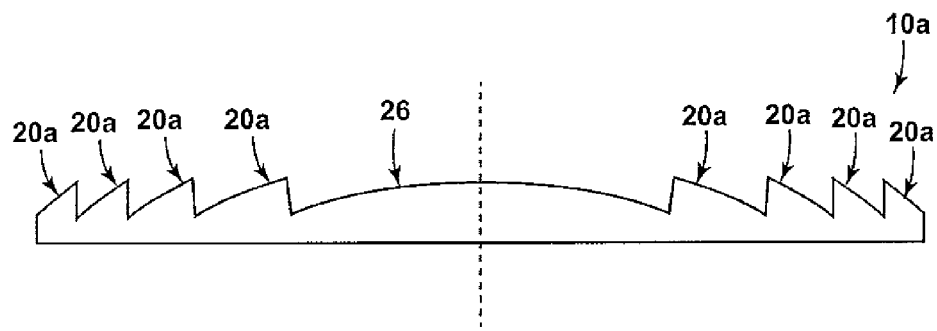
FIG. 4 is a cross-sectional view of the second Fresnel lens taken along the line IV-IV of FIG. 3.

The specific devices illustrated in the attached drawings, and described in the following specification are simply exemplary embodiments of the inventive concepts. Hence, specific dimensions and other physical characteristics relating to the embodiments disclosed herein are not to be considered as limiting.

DETAILED DESCRIPTION

The reference number 110 (FIGS. 5-6) generally designates a Fresnel lens of the present invention. The Fresnel lens 110 is configured to prevent or minimize scattering of light passing through the lens 110. The lens 110 can be clear so as to not change the color of the light passing through the lens 110 or can be colored such that light passing through the lens 110 changes color. The lens 110 includes a substrate 112 having a first face 116 and a second face 118. The second face 118 of the substrate 112 includes a lens portion 114. During use, light enters the lens 110 through the lens portion 114 to be redirected before exiting the lens 110 through the first face 116. Alternatively, light can enter the lens 110 through the first face 116 of the substrate 112 and is redirected by the lens portion 114 after exiting the substrate 112 through the second face 118 thereof.

Figure 5:
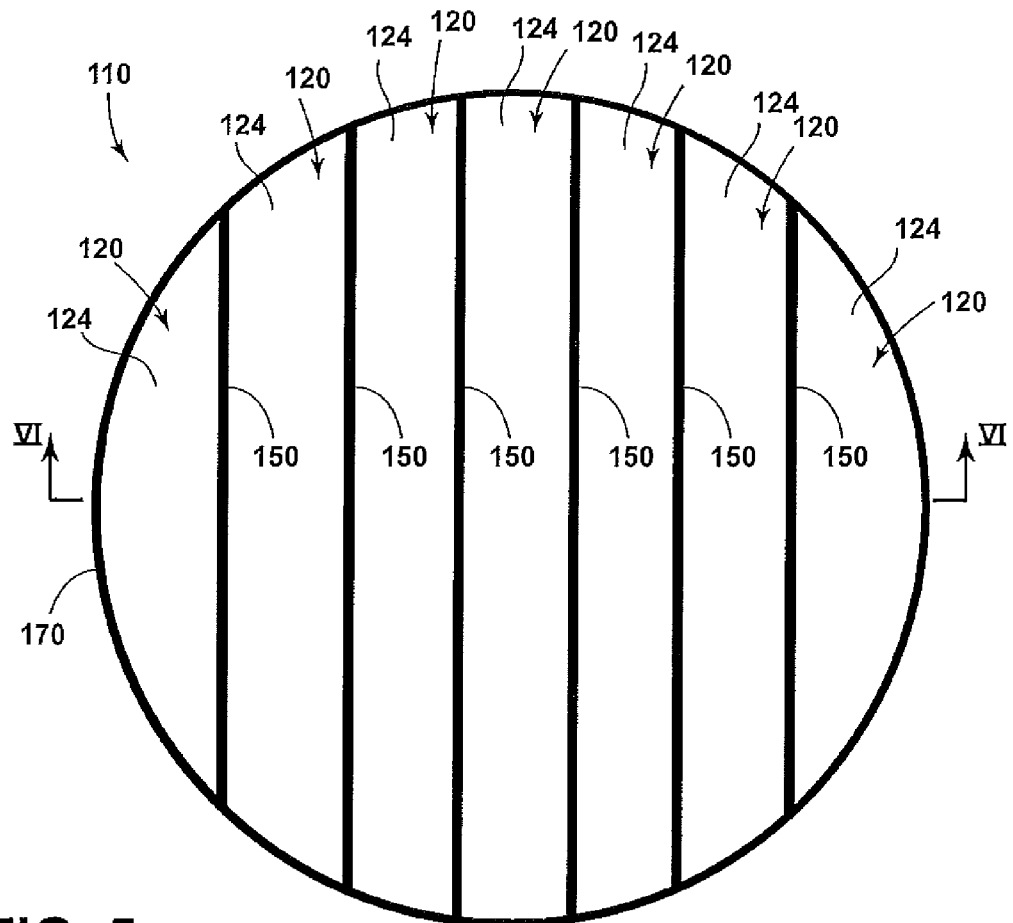
FIG. 5 is a top view of a first embodiment of a Fresnel lens of the present invention.
Figure 6:
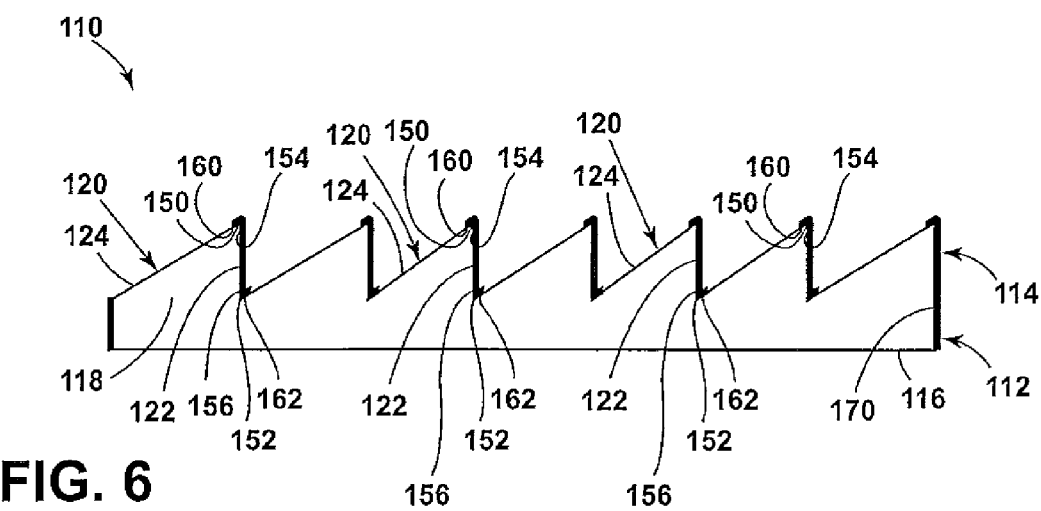
FIG. 6 is a cross-sectional view of the first embodiment of the Fresnel lens of the present invention taken along the line VI-VI of FIG. 5.

The illustrated lens portion 114 of the lens 110 includes a plurality of generally sawtooth-shaped projections 120. Each of the sawtooth-shaped projections 120 is defined by a pair of adjacent and intersecting non-refractive and refractive surfaces 122 and 124. In the first embodiment of the lens 110 as shown in FIGS. 5-6, the respective non-refractive surfaces 122 of the sawtooth-shaped projections 120 are illustrated as being substantially parallel to each other (e.g., for use in applications where light is to enter the lens portion 114 substantially parallel to the non-refracting surfaces 122). In other applications, the light can enter the lens 110 substantially perpendicular to the first face 116 of the substrate 112 and travel through the lens 110 without bending or can be bent upon entering the substrate 112 or within the substrate 112 so as to exit the substrate 112 substantially parallel to the non-refracting surfaces 122.

It is also contemplated that the non-refracting surfaces 122 could be slightly angled relative to each other to accommodate light traveling through the lens portion 114 at slightly different angles (but with the non-refracting surfaces 122 still being substantially parallel to the light crossing the second face 118 of the substrate 112). The illustrated angled refracting surfaces 124 refract the light passing through the lens portion 114 toward an area (e.g., a focus area).

In the illustrated example, the lens portion 114 of the lens 110 includes a plurality of tips 150 and crevasses 152 at the bottoms and tops, respectively, of the sawtooth-shaped projections 120. Each non-refracting surface 122 has a top edge 154 and a bottom edge 156. Likewise, each angled refracting surface 124 has a top edge 160 and a bottom edge 162. The tips 150 are located at a top intersection where the top edge 154 of the non-refracting surface 122 intersects the top edge 160 of the angled refracting surface 124. The crevasses 152 are located at a bottom intersection of adjacent saw toothed shaped projections 120 where the bottom edge 162 of the angled refracting surface 124 intersects the bottom edge 156 of the non-refracting surface 122 of an adjacent saw toothed shaped projection 120.

The illustrated lens 110 can include several features to prevent scattering of light passing through and exiting the lens 110 in order to have a sharply defined illumination area. First, the tips 150 and the crevasses 152 of the sawtooth-shaped projections 120 are sharp or acute (i.e., not curved). Such sharp tips 150 and crevasses 152 prevent scattering of light exiting the lens 110, the tips 150 and the crevasses 152, thereby preventing star-shaped patterns of light being emitted from areas of the lens 110. Second, the lens 110 includes several areas that can be opaque to prevent light from leaving undesired areas of the lens 110. As illustrated in FIGS. 5 and 6, the tips 150 and the crevasses 152 of the sawtooth-shaped projections 120 are opaque to prevent light from exiting the tips 150 and crevasses 152. If the tips 150 and crevasses 152 are opaque, the tips 150 and crevasses 152 do not have to be sharp as light will not exit the lens 110 through the opaque tips 150 and crevasses 152, thereby reducing manufacturing costs and/or complexity. The substantially parallel surfaces 122 of the sawtooth-shaped projections 120 can also be opaque between the tips 150 and the crevasses 152. It is contemplated that only the tip 150, only the crevasses 152 or both the tips 150 and the crevasses 152 could be opaque with or without the non-refracting surfaces 122 also being opaque.

Figure 7:
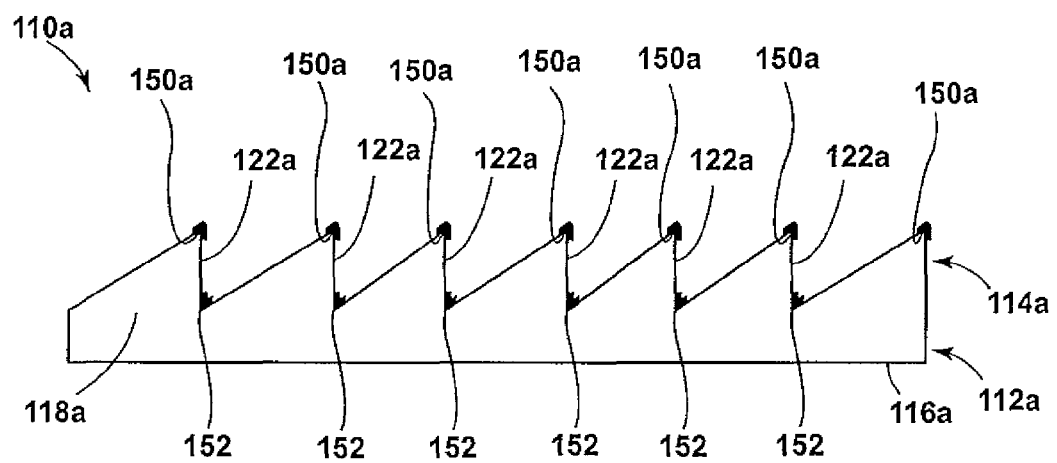
FIG. 7 is a cross-sectional view of a second embodiment of the Fresnel lens of the present invention.

FIG. 7 illustrates a second embodiment of the lens 110a wherein only the tips 150a and the crevasses 152a are opaque, but the non-refracting surfaces 122a are not opaque. It is also contemplated that an exterior peripheral surface 170 of the substrate 112 could be opaque.

Figure 8:
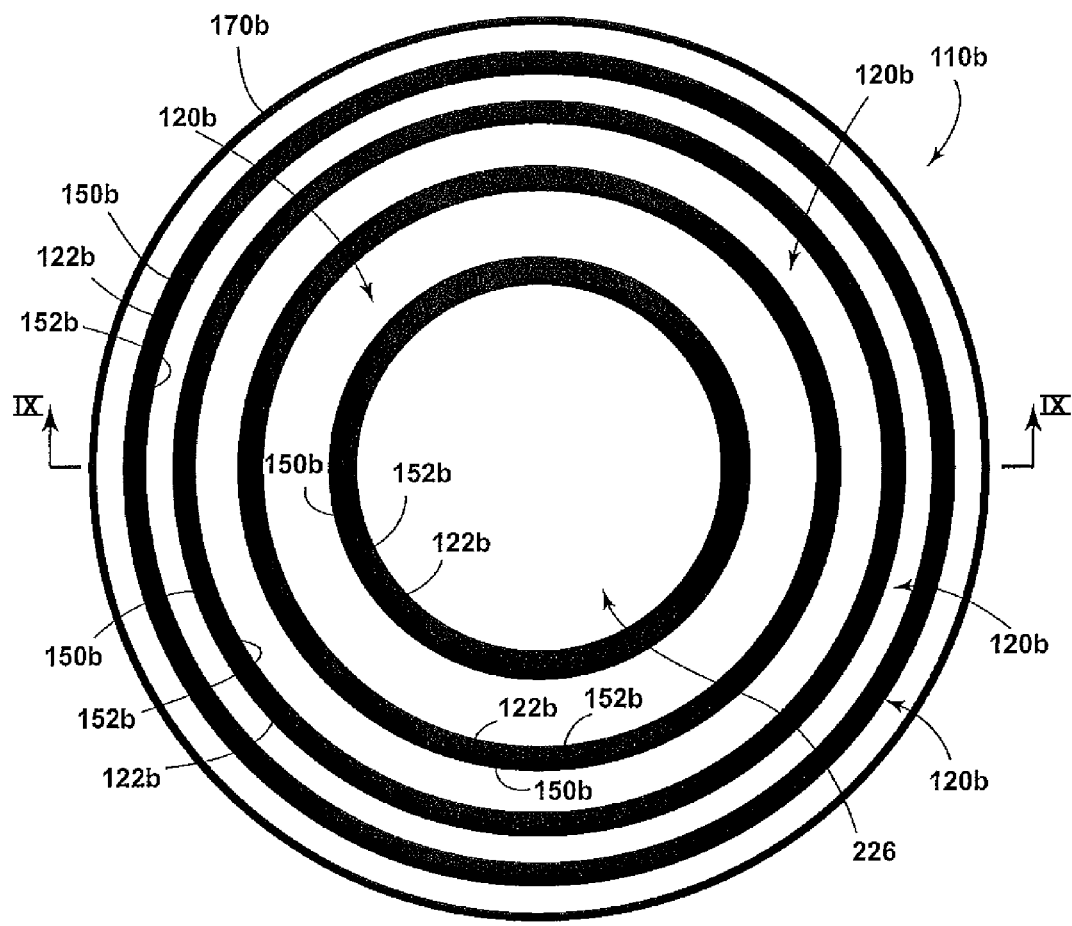
FIG. 8 is a top view of a second embodiment of a Fresnel lens of the present invention.
Figure 9:
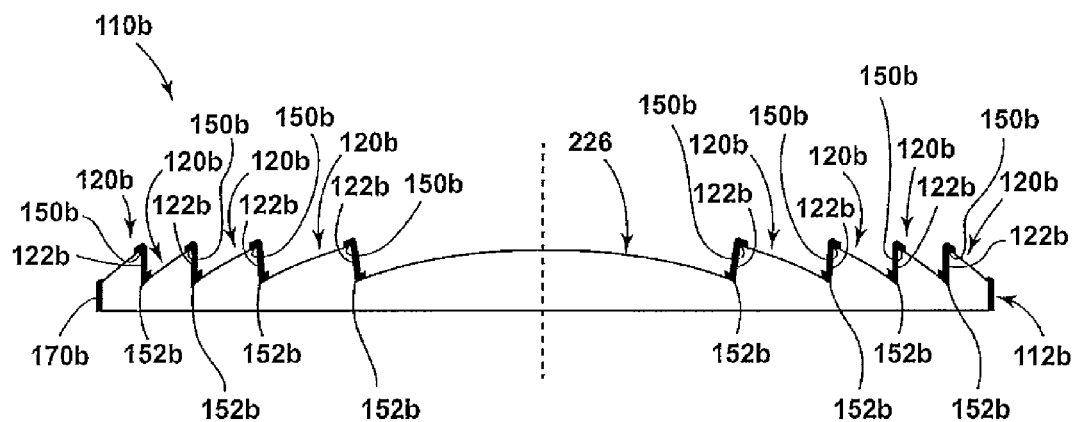
FIG. 9 is a cross-sectional view of the second embodiment of the Fresnel lens of the present invention taken along the line IX-IX of FIG. 8.

FIG. 8 illustrates a third embodiment of the lens 110b wherein the lens 110b includes protrusions 120b forming a plurality of concentric circles with a normal convex lens 226 in a center of the lens 110b. The tips 150b and the crevasses 152b of the sawtooth-shaped projections 120b are opaque to prevent light from exiting the tips 150b and crevasses 152b. The non-refracting surfaces 122b of the sawtooth-shaped projections 120b can also be opaque between the tips 150b and the crevasses 152b. It is contemplated that only the tips 150b, only the crevasses 152b or both the tips 150b and the crevasses 152b could be opaque with or without the non-refracting surfaces 122b also being opaque. It is also contemplated that an exterior peripheral surface 170b of the substrate 112b could be opaque.

The areas of the Fresnel lenses 110, 110a, 110b of the present invention that are opaque can be made opaque in any manner. For example, the areas of the Fresnel lenses 110, 110a, 110b of the present invention that are opaque can be made opaque using a marker of a type that will prevent or substantially prevent transmission of light therethrough. The Fresnel lenses 110, 110a, 110b of the present invention can be made using a two-shot injection molding process, with the opaque portions being injected before the rest of the Fresnel lenses 110, 110a, 110b (or with the opaque portions being injected second). Moreover, Fresnel lenses 110, 110a, 110b of the present invention can be made using stamping methods or any other method. Furthermore, the Fresnel lenses 110, 110a, 110b of the present invention can be made of any transparent material typically used to make lenses (e.g., glass or plastic (e.g., polycarbonate)).

The Fresnel lenses 110, 110a, 110b of the present invention can be used in any apparatus that uses a Fresnel lens. For example, the Fresnel lenses 110, 110a, 110b of the present invention can be used in the surgical light described in U.S. Application Ser. No. 61/790,892, entitled SURGICAL LIGHT WITH BEAM REDIRECTING OPTICS, the entire contents of which are incorporated herein by reference. Other uses of the Fresnel lenses 110, 110a, 110b of the present invention are contemplated.

Although the present invention has been described with reference to specific exemplary embodiments, it will be recognized that the invention is not limited to the embodiments described, but can be practiced with modification and alteration within the spirit and scope of the appended claims. For example, the opaque tips and bottoms of the projections along with the opaque wall substantially perpendicular to the light entering the lens can be used with any Fresnel lens having any configuration. Although particular preferred embodiments of the invention have been disclosed in detail for illustrative purposes, it will be recognized that variations or modifications of the disclosed apparatus, including the rearrangement of parts, lie within the scope of the present invention.

What is claimed is:

1. A Fresnel lens comprising:
a substrate having a first face and a second face;
the first face of the substrate including a lens portion comprising a plurality of sawtooth-shaped projections, each of the projections including a non-refracting surface and an angled refracting surface, the non-refracting surfaces of the projections being substantially parallel to each other, each non-refracting surface having a top edge and a bottom edge and each angled refracting surface having a top edge and a bottom edge, each projection having a top intersection where the top edge of the non-refracting surface intersects the top edge of the angled refracting surface, adjacent projections having a bottom intersection where the bottom edge of the angled refracting surface of a first one of the adjacent projections intersects the bottom edge of the non-refracting surface of a second one of the adjacent projections;

wherein the lens portion is opaque at at least one of:
  (1) the top intersection of at least one of the projections; and
  (2) the bottom intersection of at least two adjacent projections.

2. The Fresnel lens of claim 1, wherein:
each non-refracting surface is substantially planar.

3. The Fresnel lens of claim 2, wherein:
each non-refracting surface extends substantially perpendicularly from the second face of the substrate.

4. The Fresnel lens of claim 1, wherein:
each non-refracting surface is curved.

5. The Fresnel lens of claim 4, wherein:
the non-refracting surfaces substantially form concentric rings.

6. The Fresnel lens of claim 1, wherein:
an opaque coating is placed over the bottom intersection and the top intersection to make the bottom intersection and the top intersection opaque.

7. The Fresnel lens of claim 1, wherein:
all the top intersections and all the bottom intersections are opaque.

8. The Fresnel lens of claim 6, wherein:
the non-refracting surfaces are also opaque between the top intersection and the bottom intersection.

9. The Fresnel lens of claim 1, wherein:
the non-refracting surfaces are also opaque between the top intersection and the bottom intersection.

10. The Fresnel lens of claim 1, wherein:
the non-refracting surfaces of the projections are substantially parallel to each other.

11. A Fresnel lens comprising:
a substrate having a first face and a second face;
the first face of the substrate including a lens portion comprising a plurality of sawtooth-shaped projections, each of the projections including a first surface extending away from the first face at a first angle and a second surface extending away from the first face at a second angle, the first angle being greater than the second angle, each first surface having a top edge and a bottom edge and each second surface having a top edge and a bottom edge, each projection having a top intersection where the top edge of the first surface intersects the top edge of the second surface, adjacent projections having a bottom intersection where the bottom edge of the second surface of a first one of the adjacent projections intersects the bottom edge of the first surface of a second one of the adjacent projections;
wherein the lens portion is opaque at the top intersection of the projections, at the bottom intersection of adjacent projections, and on the first surface between the top intersection and the bottom intersection.

12. The Fresnel lens of claim 11, wherein:
each first surface is substantially planar.

13. The Fresnel lens of claim 12, wherein:
each first surface extends substantially perpendicularly from the second face of the substrate.

14. The Fresnel lens of claim 11, wherein:
each first surface is curved.

15. The Fresnel lens of claim 14, wherein:
the first surfaces substantially form concentric rings.

16. The Fresnel lens of claim 11, wherein:
an opaque coating is placed over the bottom intersection and the top intersection to make the bottom intersection and the top intersection opaque.

* * * * *